…

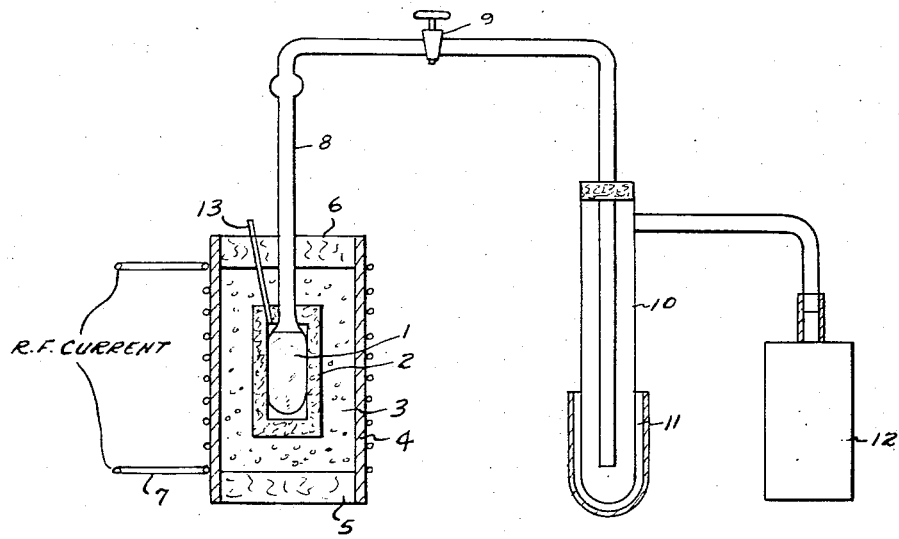

United States Patent Office 3,370,921
Patented Feb. 27, 1968

3,370,921
CRYSTALLIZATION RESISTANT VITREOUS SILICA FORMED BY THE ADDITION OF SILICON TO SILICA
Frank E. Wagstaff, Schenectady, N.Y.
(23 Kile Drive, Scotia, N.Y. 12302)
Filed Nov. 22, 1965, Ser. No. 519,806
1 Claim. (Cl. 23—182)

ABSTRACT OF THE DISCLOSURE

The process for increasing the resistance to crystallization at 1400° C. and for bubble-free oxygen deficient vitreous silica glass comprising the steps of pulverizing a very pure silica; removing the chemically combined water; adding to the pure silica powder about 0.01 weight percent of silicon and mixing the combined pure silica and silicon; packing the purified silica powder and silicon in a fused quartz container connected to a source of inert gas; heating the purified silica powder and silicon to a temperature of about 1350° C. in one-half hour and maintaining the temperature at 1350° C. for about two hours; raising the temperature of the glass to about 1900° C in one hour and maintaining the 1900° C. temperature for about 15 minutes; and then cooling the glass within the container.

---

The invention described herein may be manufactured and used by or for the United States Government for governmental purposes without the payment to me of any royalty thereon.

This invention relates to an oxygen deficient vitreous silica glass as compared with a stoichiometric crystalline silica, and to a method by which the oxygen deficient vitreous silica is made.

One object of the present invention is to provide a new and improved vitreous silica for use as optical windows and as a structural material for dependable use where extreme heat shock resistance is required, and particularly when the windows are exposed under high temperature conditions to atmospheres containing water vapor and oxygen.

A further object is to provide a composition of matter that is a defect structure due to an oxygen deficiency. The resultant composition of matter is inert at elevated temperatures to water vapor and oxygen due to its low oxygen availability.

Another object is to provide a process that includes the addition of silicon to silica prior to the fusion operation to impart an oxygen deficiency to the resultant fused silica that is free of air bubbles compared with stoichiometric crystalline silica.

The problem that this invention solves is the failure of vitreous silica at high temperatures as a result of its inherent crystallization. A series of vitreous silica samples was heated in a tube furnace at 1400° C. under water vapor conditions. Under identical treatment, a series of vitreous silica samples prepared with additional silicon, as described herein as an oxygen deficient glass, had a lower crystallization rate.

The excellent thermal shock resistance of vitreous silica has made it a very desirable refractory material. Its use, however, has been severely limited by its tendency to crystallize appreciably above temperatures of approximately 1200° C. In most cases, nucleation of the crystalline phase, cristobalite, begins on the surface and forms a layer which becomes thicker with increasing time. When the material is cooled to approximately 250° C., the cristobalite rapidly transforms to the low temperature alpha-phase, resulting in a very finely fractured material unsuitable for use.

If the vitreous silica is in a reduced state, there is an oxygen deficiency as compared with a stoichiometric crystalline silica. Although cristobalite is a poor crystalline material and can be formed with different degrees of crystallinity, it cannot accommodate the nonstoichiometry of the parent glass. Therefore the rate of crystallization is dependent upon the transport of oxygen to satisfy the stoichiometry requirements.

A crystallization resistant vitreous silica has been produced by the addition of silicon powder to silica powder. The mixture is heated under vacuum condition to approximately 1900° C. to form an oxygen deficient vitreous silica of the composition $SiO_{2-x}$.

The addition of silicon powder to silica provides a means of controlling the degree of oxygen deficiency of the glass without adding a third component. Vitreous silica fails at high temperatures as a result of its inherent crystallization. If, however, the vitreous silica is oxygen deficient, the resistance to crystallization is greatly increased.

An illustrative schematic diagram of the apparatus used in making the oxygen deficient glass as embodied in the present invention, is shown in the single figure of the accompanying drawing of an induction furnace for fusion of vitreous silica powder.

In the drawing a charge 1 of highly purified vitreous silica powder, to which a desired addition of silicon has been added, is positioned within a graphite susceptor 2. The graphite susceptor 2 is embedded in bubbled zirconia 3 packed inside of a cylindrical shell 4 that is plugged at its opposite ends by Fiberfrax discs 5 and 6. The shell is heated by a radio-frequency current supplied winding 7 of water-cooled copper tubing, or the like.

The graphite susceptor 2 opens through a vapor conducting conduit 8 that is releasably closed by a stop cock 9, or the like. Vapor that results from heating the charge within the graphite susceptor 2, is conducted by the conduit 8 for condensation within a trap 10. The trap 10 is immersed within and is chilled by a liquid nitrogen cold trap 11. The trap 10 is exhausted by means of a diffusion and mechanical pump 12.

In the experimental work, out of which the present invention arose, the glass used as prepared from Corning Glass Works Type 7940 Synthetic Vitreous Silica, which is a very pure $SiO_2$ containing approximately 0.1 of one percent of chemically combined water.

The material was crushed in a copper electrode grade crushing device of the general design of a diamond mortar. Small pieces of glass were pulverized until the powder passed through an 80 mesh sieve. Concentrated nitric acid was used to leach out the copper impurities picked up in the crushing operation. The volume of nitric acid used was approximately five times the volume of the crushed powder. The material was leached for approximately 24 hours, after which the nitric acid solution was decanted and discarded. The powder was washed in a Büchner funnel using successively distilled water and then a 5 percent hydrofluoric acid solution. The final wash was with distilled water.

After drying, the material was placed in a fused quartz crucible and fired in a vacuum at 1080° C. for 300 hours to remove the chemically combined water. To this powder was added 0.01 weight percent of finely powdered silicon and the combination was mixed in a boron carbide mortar and pestle. The fusion to form the glass was performed in an apparatus such as that shown schematically in the accompanying drawing.

The powder charge of silica and silicon was packed in a fused quartz tube and was connected to the vacuum system as shown. Temperatures were measured with an optical pyrometer by sighting through the tube 13 on the top of the fused quartz sample container. The batch was heated to 1350° C. in one-half hour and was maintained at 1350° C. for two hours, after which the temperature was raised to 1900° C. in one hour and was maintained at that temperature for 15 minutes. Holding the temperature at 1350° C. for two hours allowed the silicon to react with the silica before the mass softening into a molten glass-like material and prevented the evolution of SiO gas. At completion, the induction generator was turned off and the batch was cooled with the furnace.

During the heating process atmospheric pressure collapsed the evacuated fused quartz tube containing the powder to produce a bubble-free glass. The fused quartz tube providing the original sample container melted with the glass batch. Since the glass is very viscous, there is little mixing and the outer surface corresponding to the original fused quartz tube and the graphite susceptor may be cut away.

It is to be understood that the reagents, the reactions, the temperatures, pressures and apparatus that are disclosed herein have been submitted as being a successfully operative embodiment of the present invention, and its reduction to practice, and that limited modification may be made therein without departing from the spirit and the scope of the present invention.

I claim:

1. The process for increasing the resistance to crystallization at 1400° C. and for making a bubble-free oxygen deficient vitreous silica glass comprising the steps of pulverizing a very pure silica until it passes through an 80 mesh sieve; removing the dehydrating chemically combined water; adding to the pure silica powder about 0.01 weight percent of silicon and mixing the combined pure silica and silicon; packing the purified silica powder and silicon in a fused quartz container connected to a source of inert gas; heating the purified silica powder and silicon to a temperature of about 1350° C. in one-half hour and maintaining the temperature at 1350° C. for about two hours to allow the silicon to react with the silica before the mass softens into glass and to prevent the evolution of silicon monoxide gas; raising the temperature of the glass to about 1900° C. in one hour and maintaining the 1900° C. temperature for about 15 minutes; and then cooling the glass within the container.

References Cited

UNITED STATES PATENTS 2,182,384   12/1939   McGregor _____ 258—8

OTHER REFERENCES

A. Cohen, "J. Chem. Physics," 23, pp. 765–6 (1955).
V. Garino-Canina, "Comptes Rendus," Tome 242, p. 1982 (1956).

OSCAR R. VERTIZ, *Primary Examiner.*

A. J. GREIF, *Assistant Examiner.*